United States Patent [19]

Cookson

[11] 4,110,551
[45] Aug. 29, 1978

[54] EXTRUDED SHEATH SECTION FOR COMPRESSED GAS INSULATED TRANSMISSION LINES

[75] Inventor: Alan H. Cookson, Southborough, Mass.

[73] Assignee: Electric Power Research Institute, Inc., Palo Alto, Calif.

[21] Appl. No.: 732,227

[22] Filed: Oct. 14, 1976

[51] Int. Cl.² .............................................. H01B 9/06
[52] U.S. Cl. ...................................... 174/27; 29/624; 174/14 R; 174/16 B; 174/28
[58] Field of Search .................... 174/28, 29, 27, 99 B, 174/16 B, 14 R, 10; 29/624

[56] References Cited

U.S. PATENT DOCUMENTS

| | | | |
|---|---|---|---|
| 2,141,894 | 12/1938 | Alexanderson | 174/27 X |
| 3,515,939 | 6/1970 | Trump | 174/14 R X |
| 3,730,968 | 5/1973 | Szente-Varga | 174/27 |
| 3,758,701 | 9/1973 | Schmidt | 174/28 |
| 3,864,507 | 2/1975 | Fox et al. | 174/14 R |
| 3,916,081 | 10/1975 | Floessel et al. | 174/28 |
| 3,919,456 | 11/1975 | Floessel | 174/27 |
| 4,053,338 | 10/1977 | Bolin | 174/16 B |

FOREIGN PATENT DOCUMENTS 438,560  11/1935  United Kingdom ...................... 174/27

Primary Examiner—Arthur T. Grimley
Attorney, Agent, or Firm—Townsend and Townsend

[57] ABSTRACT

A compressed gas-insulated transmission line (CGIT) system, apparatus and techniques are disclosed in which extruded grooves along the inner surface of an encasing sheath are provided for simplified alignment and mounting of insulative spacers. The spacers, mounted to the alignment grooves, support current-carrying conductors within the sheath assembly in either a sliding or fixed relationship to the groove. Spacers in a sliding configuration may be provided with bearings to further simplify alignment. The spacers can be aligned longitudinally to permit the optimization of the mechanical and electrical characteristics of the system. Traps for unwanted particulate matter at large within the system may be provided by arcuately mounted perforate plates across the grooves, by radially mounted perforate fixtures, or by lips at the junction of the arcuate segments comprising the encasing sheath. Spacer and trap configurations can be combined in a single assembly.

18 Claims, 3 Drawing Figures

EXTRUDED SHEATH SECTION FOR COMPRESSED GAS INSULATED TRANSMISSION LINES

This invention was made under contract for or supported by the Electric Power Research Institute, Inc.

BACKGROUND OF THE INVENTION

1. Field of the Invention

This invention relates to methods and apparatus for fabricating compressed gas insulated transmission line (CGIT) systems for electric power applications.

2. Description of the Prior Art

In a typical CGIT system, one or more generally aluminum conductors are suspended within a metallic, generally aluminum sheath on dielectric spacers. The sheath is filled with a gas, typically sulphur hexafluoride ($SF_6$) pressurized at about 50 psig. The spacers are typically cast epoxy posts or discs affixed to the inner wall of the aluminum sheath to maintain a fixed minimum separation between conductors and between the sheath and encased conductors. One form of a single conductor CGIT assembly is described in U.S. Pat. No. 3,864,507.

The major cost of a CGIT assembly lies in the fabrication of the aluminum sheath. The larger diameter aluminum sheaths, typically exceeding 21 inches in diameter, are difficult to construct according to conventional techniques. For such large diameter sheaths, spiral welding or rolling and welding have been suggested. Where still larger diameter sheaths are required, and particularly in multiple conductor systems, where for example three conductors are provided within a single sheath, assembly can be unwieldy and alignment difficult.

In order to facilitate construction of large diameter sheaths, it has been suggested that the sheath be fabricated in a plurality of modular elongated sections of semicircular cross section which may readily fit together.

The multiple section construction technique renders accurate cable alignment difficult. Improved methods are thus needed for extruding sheath sections wherein the alignment and mounting of cable spacers are simplified in order to optimize cable operation, save construction time and hence cost.

OBJECTS OF THE INVENTION

It is an object of the present invention to devise a means for fabrication of CGIT systems with a lower assembly time than for existing systems.

It is further an object of the present invention to provide improved means for aligning spacers within CGIT systems. It is a further object of the present invention to provide improved means for the entrapment of unwanted particulate material within a CGIT system.

It is a further object of the present invention to provide an improved method for fabrication of a CGIT system wherein short circuits between conductors and conductor vibration is minimized.

SUMMARY OF THE INVENTION

The invention comprises a method and apparatus for fabrication of a compressed gas insulated transmission line assembly which simplifies alignment and mounting of spacers and which provides for a variety of particle traps within the assembly. An elongated gas tight rigid conductive sheath, typically fabricated of a plurality of elongated arcuate aluminum sections, is provided with at least one groove along the interior of the sheath wall. The groove is typically formed during the extrusion of the sheath section. Insulated spacers, which may be mounted on bearings which may be subsequently affixed to the grooves, are aligned along the grooves to suspend conductive lines within the sheath at a preselected spacing. The grooves facilitate rapid and accurate alignment by optimizing longitudinal and radial placement of the spacers. Particle traps may be further provided along the grooves for removing undesired particulate material contaminating the assembly interior. The particle traps may be separate units, mounted adjacent the sheath interior wall, or may be combined in a single unit with the alignment spacers.

BRIEF DESCRIPTION OF THE DRAWINGS

These and more detailed and specific objects, features and advantages of the present invention are more fully disclosed in the following specification, reference being made to the accompanying drawings which.

DETAILED DESCRIPTION OF PREFERRED EMBODIMENTS

Figure 1:
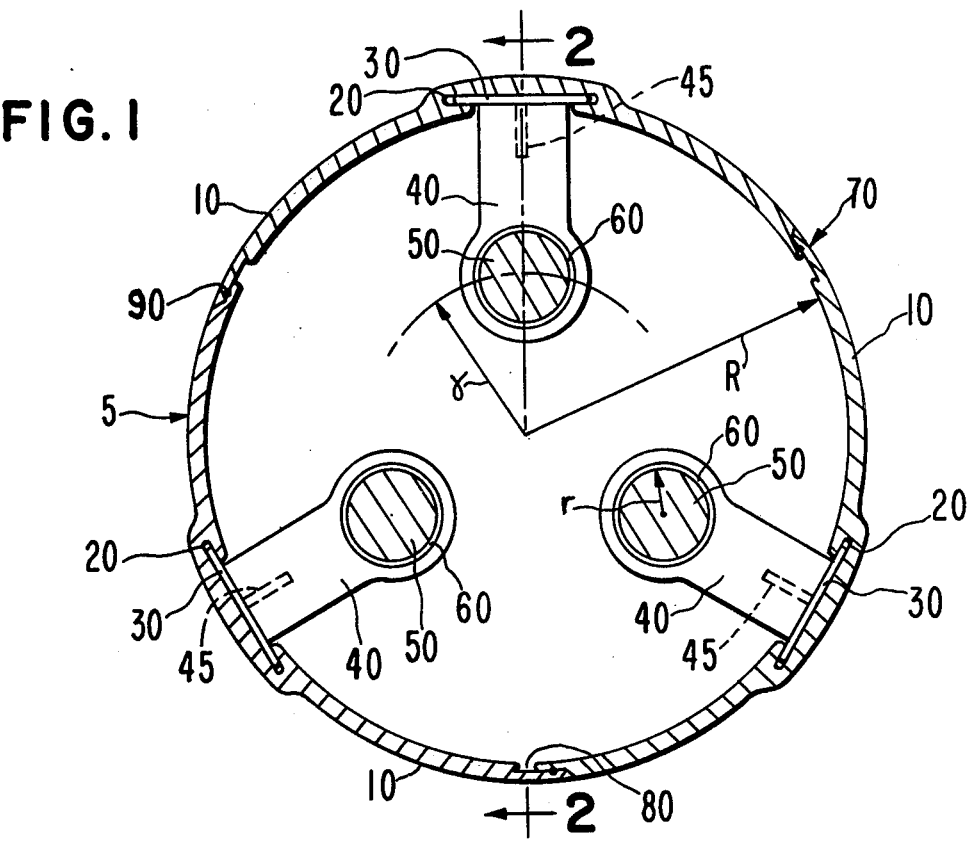
FIG. 1 is an axial cross-sectional view of an embodiment of the present invention in which three conductors are provided.

In FIG. 1 is pictured an axial cross-sectional view of a CGIT system of the present invention comprising a hollow tubular sheath 5 fabricated of a plurality of sheath sections 10, each sheath section 10 including an axial extruded groove 20 supporting a tangentially disposed metal plate 30 to which is mounted a dielectric spacer 40 for supporting a conductor 50 on the interior of the sheath 5 at a selected distance from the inner wall and from the other conductors 50. Each conductor 50 is supported within an aperture of the spacer 40 by a metal sleeve 60. Each section 10 is welded together along longitudinal junctions 70, which may be a tongue and groove configuration providing a notch along the interior of the sheath 5. A seal weld 90 may be provided along the exterior of junctions 70 at the time of assembly.

The spacers 40 are typically a dielectric insulative material such as a castable epoxy. The metal sleeve 60 about the cable aperture and a metal insert 45, extending radially at the outer end of the spacer 40 are cast into the spacer 40 at the time of fabrication. The metal insert 45 facilitates attachment between the spacer 40 and the metal plate 30 mounted to the groove 20.

The spacers 40 support the conductors 50 at a preselected distance from the sheath 5 walls and from the center of the sheath 5. For example, where R is the inner radius of sheath 5, r is the inner radius of the the conductors 50 and $\gamma$ corresponds to the distance of the midpoint of sheath 5 to the equidistant midpoints of the three conductors 50, the optimized ratio of r/R equals 0.18, and the optimized relation of $\gamma$/R is 0.51 for high voltage applications. Specifically, for a representative 345/Kv system, $r$ may be 2.5 inches, $R$ may be 13.8 inches, and $\gamma$ may be about 6.9 inches.

The metal plates 30 which support the spacers 40 may be fitted to the grooves 20 in a variety of ways. For example, the spacers may be fixably mounted in the grooves 20 by welding, by the use of an adhesive or by crimping longitudinal lips of the groove over the corners of metal plate 30. Alternatively, the metal plate 30 may be slidably mounted to the groove 20 by means of Nylon or Teflon type bearings, which permit the spacers 40 to be longitudinally positioned along the alignment groove 20. Where the spacer 40 is rigidly affixed relative to the sheath 5, it is important that the conductors 50 be slidable within the sleeves 60. On the other hand, where the spacers 40 are slidable with respect to the sheath 5, the conductor 50 may be fixed relative to the spacer 40. It is important that one of the mounting points of the spacer 40 be slidable to make allowance for thermal expansion of the conductors 50 and the sheath 5.

Figure 2:
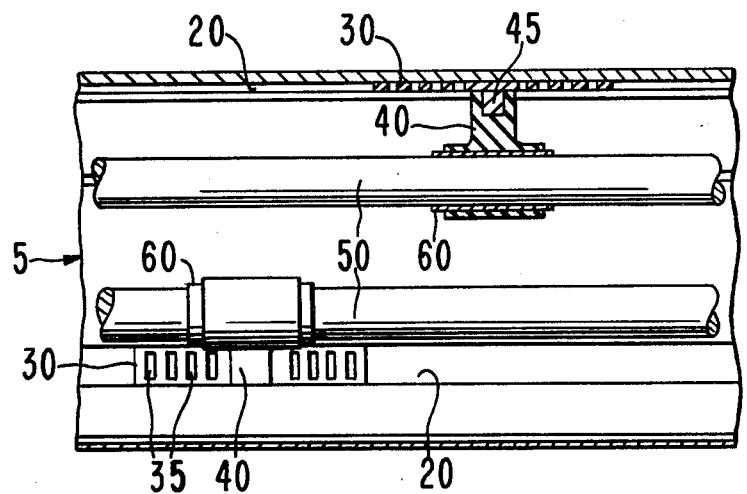
FIG. 2 is a longitudinal perspective view in partial cutaway of the embodiment of FIG. 1, in which two conductors are illustrated.

Spacers 40 are slidable on low friction bearings along the alignment groove 20 have particular advantages in a multiple conductor system, such as a three-phase conductor system. Referring particularly to FIG. 2, it can be seen that the spacers 40 may be aligned in different cross-sectional planes. Thus, where the spacers 40 are arranged so that each conductor 50 is supported at a different longitudinal position of spacer 40, the midspans of the conductors 50 between spacers 40 are distributed along the length of the sheath 5. Such spacing prevents conductors 50 from inadvertently touching one another during possible wide lateral motion of the conductor mid-spans. Such oscillatory conditions typically occur under fault current conditions such as short circuits.

Other provisions must also be made for high current conditions. For example, the spacer supporting planes 30 must be firmly secured to the sheath 5. This is most readily achieved by extruding lips along the edges of the plate-retaining groove 20. Since the required strength of the groove lips is roughly inversely proportional to the forces applied thereto, it may be found desirable to utilize lengthened metal plates 30 for supporting the spacers 40 in order to distribute the load on the groove lips.

It is often desirable to include particle traps interior of the sheath 5 to remove contaminating conductive particles. Such spurious particles may remain from manufacture or may have been produced upon installation or movement of the assembly. FIG. 2 is useful for illustrating one type of particle trap. The particle trap illustrated in FIG. 2 comprises perforations or slots 35 disposed across mounting plate 30, which is mounted across the groove 20. The slots 35 are operative to trap the undesired particles transported in the gas between the underside of the plate 30 and interior of the groove 10. Perforate metal plate particle traps mounted across the groove 20 and spaced along the sheath 5. Alternatively, the particle traps may be incorporated into the base plate 30 supporting a dielectric spacer 40, in which case each conductor-supporting spacer 40 also serves as a collection point for the contaminating particles.

Figure 3:
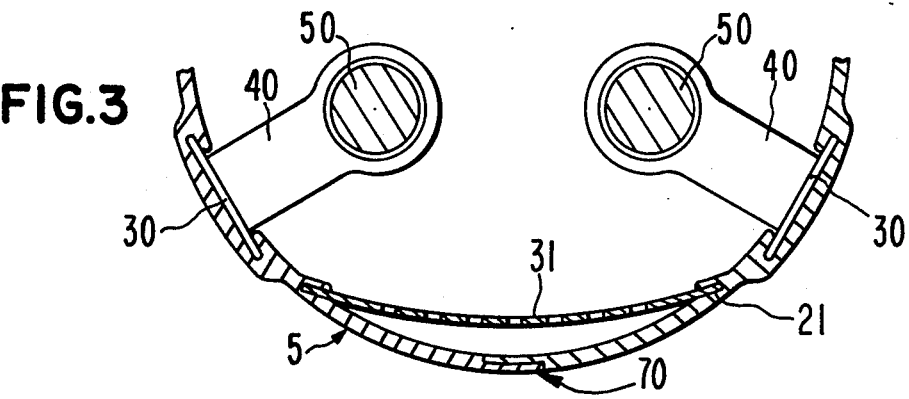
FIG. 3 is a partial axial cross-sectional view of an embodiment of the present invention showing a particle trap, in which a further groove pair is extruded in the sheath wall to accommodate the particle trap of particulate material.

A further embodiment of a particle trap according to the invention is illustrated in FIG. 3. Therein spacers 40 are shown supporting conductors 50 on base plates 30 in an extruded groove within the wall of sheath 5. In addition, a particle trap comprising a perforate sheet 31 is mounted along the interior wall of sheath 5 for accommodating the perforate metal sheet 31. The perforate sheet 31 is fitted along lips 21 so as to bridge the longitudinal junction 70 between sheath sections 10.

Still other embodiments of particle traps are comtemplated. For example, in FIG. 1, notch 80 along junction 70 may operate as a particle trap, especially for particulate material loosened during welding along the junction 70. The slotted base plate 30, the perforate sheet 31 and the longitudinal notch 80 all make effective yet simple particle traps.

The principles of the present invention have now been described and illustrated by specific embodiments, to which many modifications, arrangements of components and choices of variables will be apparent to those reasonably skilled in the art without departing from the invention. It is therefore intended that the invention not be limited except as provided in the appended claims.

I claim:

1. A three-phase compressed gas insulated transmission line system comprising:

a gas-tight elongated hollow aluminum sheath fabricated in three elongated sections and adapted to contain a pressurized gas;

three elongated conductors positionable longitudinally within said sheath, each conductor associated with a single sheath section;

a plurality of insulated spacers each associated with one of said sections, each said spacer having at an inner end a sleeve with conductor apertures to embrace and support one said conductor, and having an outer end for mounting to said associated elongated sheath section, said sheath section including a groove extruded longitudinally along the inner wall of said sheath section and adapted to receive said outer end of said spacers; and a plurality of metal plates, mounted to each said spacer outer end and slidably mounted within said elongated groove for affixing said associated conductor at a preselected distance from said elongated section, said metal plates being further provided with a plurality of apertures of such size as to entrap conductive particles in the space between the underside of said plate and said groove;

said spacers being mounted at selected longitudinal positions along said sheath and longitudinally separated from spacers mounted to adjacent sheath sections.

2. A transmission line system according to claim 1, wherein said sheath further includes longitudinal lips radially displaced from said groove, and said system further includes a perforate metallic sheet affixed between said longitudinal lips for entrapping particulate material interior of said sheath beneath said perforate sheet.

3. A compressed gas insulative transmission line system according to claim 1, wherein said sheath sections are fabricated of extruded aluminum and said sheath is filled with pressurized $SF_6$ gas.

4. A method for fabricating a high voltage capacity transmission line system suitable for containing an insulated compressed gas, said method comprising the steps of:

extruding a plurality of substantially identical elongated arcuate sheath sections having an inner wall and an outer wall, each said extruded sheath section defining at least one longitudinally extruded groove along said inner wall between and generally parallel to side margins of each said sheath section;

mounting a plurality of insulated spacers to said groove along said sheath section;

mounting a conductor to spacers of only one said section for spacing said conductor at a selected distance from said sheath section; and thereafter sealably joining mating side margins of said sheath sections to form a hollow gas tight elongated sheath enclosing at least one conductor at a predetermined orientation within said sheath.

5. A method as in claim 4, including the steps of fixedly mounting said spacers to a conductor and slidably mounting said spacers to an associated groove along said sheath section.

6. A method as in claim 4, further including the steps of fixedly mounting said spacers to a groove and slidably mounting said spacers to an associated conductor.

7. A method as in claim 4, wherein the step of mounting said spacers to said sheath section further comprises mounting a perforated plate to the sheath-confronting end of at least one of said spacers, affixing said spacer in the associated groove and providing a cavity on the side of said plate for trapping loose particulate matter interior of said sheath.

8. A method as in claim 4, wherein said extruded groove includes extruded parallel lips along said sheath section, and further comprising the step of mounting a perforate sheet between said lips providing a cavity on one side of said sheet adjacent said sheath wall for trapping loose particulate matter interior of the sheath.

9. A method as in claim 4, wherein said spacers are attached to said conductor prior to the attachment of said spacers to said sheath section.

10. A method as in claim 4, wherein said spacers are attached to said sheath section at selected longitudinal locations prior to the attachment of spacers to said conductor.

11. A compressed gas insulated transmission line for enclosing at least one transmission line comprising:

a conductive gas-tight elongated tubular sheath for containing an insulative gas under pressure, said sheath comprising at least two elongated sections longitudinally joined together along abutting side margins of said sections, each said section including a longitudinal groove extruded in the interior wall between said margins, said groove including first and second opposing edges adapted to retain insulative spacers at a uniform lateral position between said margins;

a plurality of dielectric insulative spacers disposed along the interior of each said section positioned between said side margins; and at least one elongated conductive line positioned longitudinally within said sheath, each said line being spaced a predetermined distance from the interior wall of one said section by means of said plurality of insulated spacers mounted to only one said section, one end of said spacers being affixed to said line for setting said line in a predetermined position within said sheath.

12. An apparatus as in claim 4, wherein said groove includes first and second opposing lips along said opposing edges for retaining said spacers at a uniform lateral position between said side margins.

13. An apparatus as in claim 11, wherein said spacer includes a plate fitted in said groove between said edges mounting said spacer to said groove, said metal plate being provided with a plurality of perforations providing small passageways between the interior of said sheath and a portion of the inner wall said sheath section at said groove for trapping loose particulate matter within said sheath.

14. An apparatus as in claim 12, wherein said insulated spacers are slidably mounted within said groove upon bearings.

15. An apparatus as in claim 11 wherein said spacers are longitudinally disposed along said groove approximately quidistant longitudinally between spacers of adjacent sheath sections for minimizing the possibility of cable confluence at locations between said spaces.

16. An apparatus as in claim 11, wherein said transmission line system is a three-phase system comprising three sheath sections, each sheath section supporting one conductive line upon a plurality of spacers, wherein the diameter of said conductors is about 0.18 of the inner diameter of said sheath and wherein the radial distance from the center of said sheath to the common radius of location of said conductors is about 0.51 of the inner radius of said sheath, and further wherein the longitudinal spacing of said spacers is equal to about one-third of the longitudinal span of said conductors between spacers supporting a single conductor.

17. A compressed gas insulated transmission line system for enclosing at least one transmission line comprising:

a conductive gas-tight elongated tubular sheath for containing an insulative gas under pressure, said sheath comprising at least two elongated sections longitudinally joined together along abutting side margins of said section, each said section including longitudinally extending rigid extruded grooves between said side margins and facing one another in the interior wall of each said section, and a particulate trap comprising a slotted screen arcuately affixed between said facing grooves such that inwardly directed forces tend to press said screen within said grooves;

a plurality of dielectric insulative spacers disposed along the interior of each said section positioned between said side margins; and at least one elongated conductive line positioned longitudinally within said sheath, each said line being spaced a predetermined distance from the interior wall of one said section by means of said plurality of insulated spacers mounted to only one said section, one end of said spacers being affixed to said line for setting said line in a predetermined position within said sheath.

18. An extruded sheath section for a compressed gas insulated transmission line comprising:

an elongated arcuate unit in lateral cross section having a male joint along one lateral margin;

a mating female joint along the opposite lateral margin for mating with a male joint of an adjacent sheath section; and a groove along the interior portion of said arcuate segment between said lateral margins and adapted to retain a plurality of insulative spacers in fixed relation relative to said side margins which support a single conductive line in substantially fixed relation to said section.

* * * * *